United States Patent
Maple et al.

(10) Patent No.: US 6,437,462 B1
(45) Date of Patent: Aug. 20, 2002

(54) BI-DIRECTIONAL DC/DC CONVERTER AND CONTROL METHOD THEREFOR

(75) Inventors: Robert Maple, Noblesville; Aurelien T. Mozipo, Kokomo; Tillasthanam V. Sriram, Carmel, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/012,836

(22) Filed: Dec. 10, 2001

(51) Int. Cl.$^7$ ................................................. H02S 1/00
(52) U.S. Cl. ........................................ 307/75; 307/80
(58) Field of Search .......................... 307/44, 45, 46, 307/75, 80, 86, 87

(56) References Cited

U.S. PATENT DOCUMENTS

| | | | | |
|---|---|---|---|---|
| 4,736,151 A | * | 4/1988 | Dishner | 206/813 |
| 6,232,674 B1 | * | 5/2001 | Frey et al. | 307/10.1 |
| 6,304,068 B1 | * | 10/2001 | Hui et al. | 323/225 |
| 6,320,358 B2 | * | 11/2001 | Miller | 307/10.1 |

\* cited by examiner

Primary Examiner—Shawn Riley (74) Attorney, Agent, or Firm—Margaret A. Dobrowitsky (57) ABSTRACT

Method and system for bi-directionally controlling power flow between two separate direct current power sources in a multi-stage power converter system are provided. The method allows providing at least first and second power converter stages coupled in parallel circuit to one another. The method further allows providing a first switching controller coupled to selectively actuate a pair of switching devices in the first power converter stage, and a second switching controller coupled to selectively actuate a pair of switching devices in the second power converter stage. One of the first and second switching controllers is selected as a master controller, and the other one of the first and second switching controllers is selected as a slave controller. An average voltage measurement is determined at a respective node of each the power converter stages. A compensating signal is generated based on the difference of the average voltage measurements at the respective nodes of each of the power converter stages. The compensating signal is applied to the slave switching controller so that the pair of power switching devices coupled to that slave switching controller is selectively actuated to have a respective on and off duty cycle. The duty cycle imparted by the slave controller is adjustable in response to the compensating signal relative to the duty cycle imparted by the master controller to the pair of power switching devices coupled thereto in order to avoid current imbalance between the power converter stages.

21 Claims, 5 Drawing Sheets

BI-DIRECTIONAL DC/DC CONVERTER AND CONTROL METHOD THEREFOR

BACKGROUND OF THE INVENTION

The present invention is generally related to control techniques for performing power conversion in a multi-stage power converter system, and, more particularly, to method and system for performing DC/DC power conversion and controlling power flow between at least two separate power sources in a multi-stage power converter system.

Power converter systems, such as made up of a plurality of power converter stages connected in parallel and of essentially the same design, e.g., having substantially the same power ratings relative to one another, need to address various issues in order to provide cost-effective and reliable power conversion. For example, when the power converter system supplies power to a load, due to a variety of factors such as component variation, switching speed differences, offsets, etc., some of the converters could carry less of the load than others. Such an uneven load distribution among the converters is unacceptable. Further, the efficiency of the system is decreased because of uneven load distribution.

Another issue that may detrimentally impact efficient operation of power converter systems connected to separate power sources that, for example, are designed to operate at different voltage levels relative to one another, would arise if synchronous rectification techniques are not appropriately configured for those power conversion applications. Using synchronous rectification techniques, a switching device, such as a FET in parallel with its body diode is turned on during a freewheeling period to reduce the voltage drop and improve conversion efficiency. Using standard synchronous rectification techniques in a power converter connected to separate power sources can lead to a momentary but undesirable discharge of the power sources, if the switching device is not turned off in the event of reversal of current flow.

Another issue that is important in the operation of a power converter system, such as one connected to separate power sources, deals with reliably and economically protecting the system and associated equipment from fault conditions that may arise, such as in the power converter, in the power sources, in the loads or both. For example, when two or more power sources are connected through a DC/DC converter without galvanic isolation a means for quickly and automatically isolating the power sources needs to be provided to protect the sources from faults within the converter, or to protect the converter from external faults, for example, due to improper reversal of the connections for the sources.

Thus, in view of the foregoing discussion, it is desirable to provide system and control techniques that allow for improved forced current balance in parallel converters. It would also be desirable to provide system and control techniques that allow for improved synchronous rectification in the power switching devices. It would be further desirable to provide an improved input to output isolation and converter protection circuit.

BRIEF SUMMARY OF THE INVENTION

Generally, the present invention fulfills the foregoing needs by providing in one aspect thereof a method for bi-directionally controlling power flow between at least two separate direct current power sources and loads in a multi-stage power converter system. The method allows providing at least first and second power converter stages coupled in parallel circuit to one another. The method further allows providing a first switching controller coupled to selectively actuate a pair of switching devices in the first power converter stage, and a second switching controller coupled to selectively actuate a pair of switching devices in the second power converter stage. One of the first and second switching controllers is selected as a master controller, and the other one of the first and second switching controllers is selected as a slave controller. An average voltage measurement is determined at a respective node of each of the power converter stages. A compensating signal is generated based on the difference of the average voltage measurements at the respective nodes of each of the power converter stages. The compensating signal is applied to the slave switching controller so that the pair of power switching devices coupled to that slave switching controller is selectively actuated to have a respective on and off duty cycle. The duty cycle imparted by the slave controller is adjustable in response to the compensating signal relative to the duty cycle imparted by the master controller to the pair of power switching devices coupled thereto in order to avoid current imbalance between the power converter stages. In other aspects of the invention, the method further allows improved techniques for performing synchronous rectification in the power switching devices, and providing input/output isolation and protection to the power system and/or power sources under faulty conditions.

The present invention further fulfills the foregoing needs by providing in another aspect thereof, a multi-stage power converter system for bi-directionally controlling power flow between at least two separate direct current power sources and loads. The power converter system includes at least first and second power converter stages coupled in parallel circuit to one another. The system further includes a first switching controller coupled to selectively actuate a pair of switching devices in the first power converter stage and a second switching controller coupled to selectively actuate a pair of switching devices in the second power converter stage. One of the first and second switching controllers is selected as a master controller, and the other one of the first and second switching controllers is selected as a slave controller. A feedback controller is configured to avoid current imbalance between the power converter stages by:

determining an average voltage measurement at a respective node of each the power converter stages;

generating a compensating signal based on the difference of the average voltage measurements at the respective nodes of each of the power converter stages; and applying the compensating signal to the slave switching controller so that the pair of power switching devices coupled to that slave switching controller is selectively actuated to have a respective on and off duty cycle, the duty cycle imparted by the slave controller being adjustable in response to the compensating signal relative to the duty cycle imparted by the master controller to the pair of power switching devices coupled thereto, thus avoiding current imbalance between the power converter stages.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

General System Description

Figure 1:
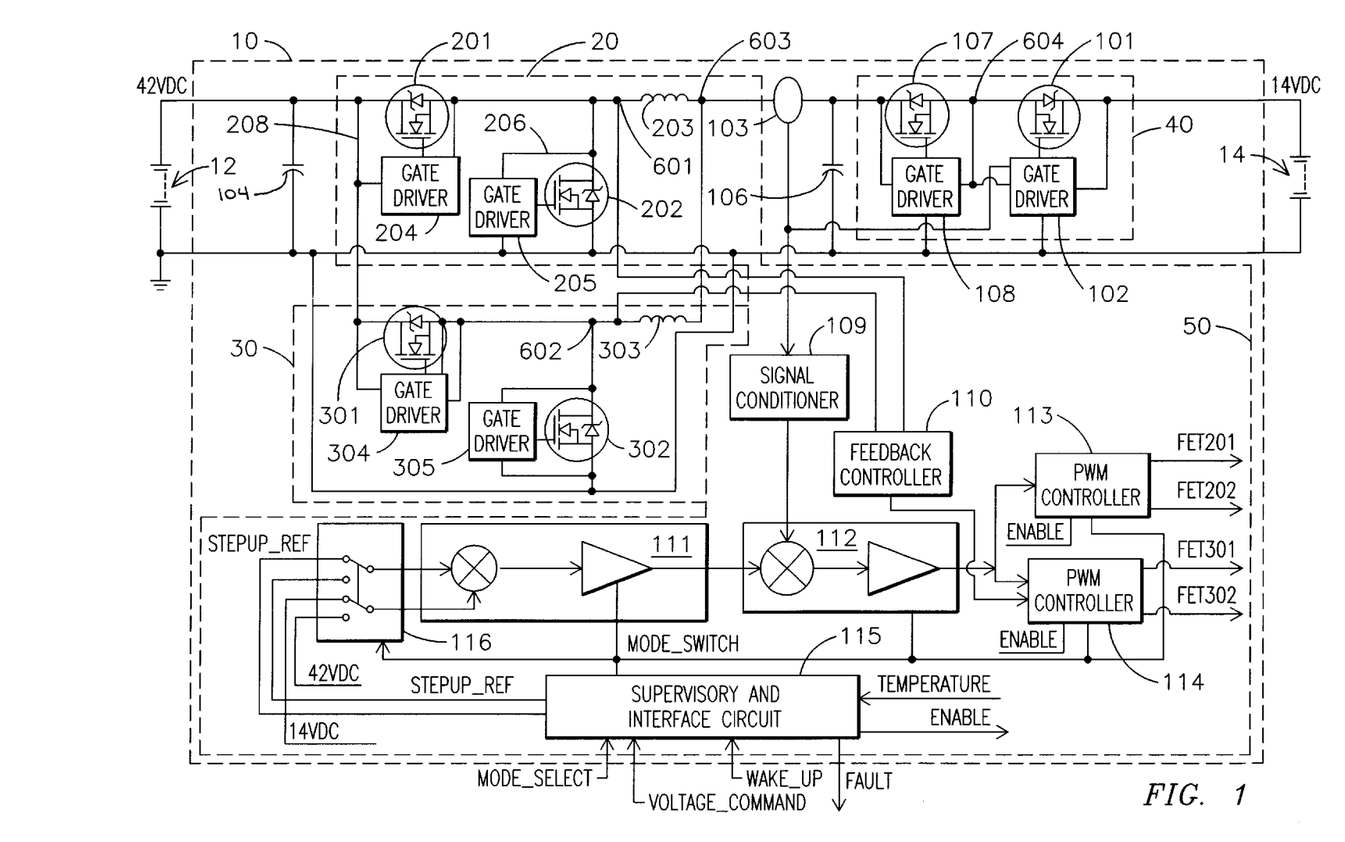
FIG. 1 illustrates a schematic representation of one exemplary embodiment of a dual voltage DC/DC converter system in accordance with aspects of the present invention.

FIG. 1 shows one exemplary embodiment of a dual voltage DC/DC converter system 10 in accordance with aspects of the present invention. Blocks 20 and 30 in FIG. 1 represent two exemplary power converter stages of the converter system. As will be appreciated by those skilled in the art, each block is a synchronous converter that can convert power bi-directionally. For example, depending on the operational state of the system, power conversion can take place from a first power source, e.g., battery 12, operating at a relatively higher voltage to a second power source, e.g., battery 14, operating at a lower voltage relative to the first power source. In one exemplary embodiment suitable for a hybrid vehicle application, the first power source comprises a 42 VDC battery and the second power source comprises a 14 VDC battery. It will be appreciated that the techniques of the present invention are not limited to either batteries functioning as the power sources, or to the foregoing exemplary voltages for the power sources. For example, fuel cells or other sources of electrical power could be used in lieu of batteries. Conversely, power conversion can occur from the second power source to the first power source. Not shown are one or more loads that may be connected in parallel to the power sources. It will be understood that the term "power source" as used herein encompasses devices that may be used for generating or converting electrical power into other forms of energy. For example, a battery may generate electrical power or may convert electrical power into a chemical form of energy. Thus, the power source may be a rechargeable device that at times may act as a load relative to other power sources. It will be further appreciated that the power converter system is not limited to two power converter stages, since additional stages can be connected in parallel and could be phase shifted with respect to one another using techniques well-understood by those skilled in the art.

As further illustrated in FIG. 1, block 40 represents an input/output isolation and protection circuit, and block 50 represents a low-power circuit used for operational control of the converter system. Each of the foregoing circuits will be described in greater detail below. A current measurement device 103 and capacitors 104 and 106 are parts shared in common by the converter stages and conceptually do not belong exclusively within any particular stage.

The power converter stage represented by block 20 comprises a pair of power switching devices, e.g., field effect transistors (FETs) 201 and 202 and their associated gate drivers 204 and 205, respectively. Also shown is an inductor 203 having one terminal thereof connected to a node 601 and its other terminal connected to a node 603. Similarly, the power converter stage represented by block 30 comprises a pair of power switching devices, e.g., FETs 301 and 302 and their associated gate drivers 304 and 305, respectively. Also shown is an inductor 303 having one terminal thereof connected to a node 602, and its other terminal connected to node 603. Thus, inductors 203 and 303 are mutually connected to one another at the node 603.

The input/output isolation and protection circuit represented by block 40 comprises a pair of power switching devices, e.g., FETs 101 and 107 and their associated gate drivers 102 and 108, respectively. As shown in FIG. 1, the respective source terminals of FETs 101 and 107 are serially connected to one another at node 604. If optionally desired, gate drivers 102 and 108 may be integrated into a common gate driver. Further, FETs 101 and 107 could be configured with their respective drain terminals serially connected to one another in lieu of their source terminals. It will be appreciated that the power switching devices used in the present invention are not limited to Metal Oxide Semiconductor Field Effect Transistor (MOSFET) technology, since Insulated Gate Bipolar Transistors (IGBTs), or Bipolar Transistors (BTs) with suitable diodes could be utilized as well.

The control circuit represented by block 50 includes a supervisory and interface circuit 115 that performs multiple functions, such as providing electronic control to operate the DC/DC converter system in either a step up or a step down mode of power conversion; setting the output voltage of the system; monitoring and controlling the protection circuit; and interfacing with external systems. A voltage error amplifier 111 receives a signal indicative of the mode of operation from the supervisory and interface circuit 115, and appropriate voltage reference and voltage feedback signals through a switch 116. The voltage error amplifier 111 differentially combines the actual output voltage, i.e., the voltage feedback signal, with the commanded output voltage, i.e., the reference signal, to generate an error signal supplied to a current error amplifier 112. The current error amplifier 112 in turn differentially combines the error signal from the voltage amplifier 111 with a feedback current signal indicative of the output current to provide the resultant signal to respective switching controllers, e.g., pulse width modulation (PWM) switching controllers 113 and 114. For example, PWM controller 113 generates switching control signals FET201 and FET202 respectively applied through gate drivers 204 and 205 to the FET pair 201 and 202 in power converter stage 20. Similarly, PWM controller 113 generates switching control signals FET301 and FET302 respectively applied through gate drivers 304 and 305 to the FET pair 301 and 302 in power converter stage 30. The current feedback is obtained from the current sensor 103 via a suitable signal conditioner device 109.

Those skilled in the art will appreciate that the above-described type of regulation is generally known as average current mode regulation. These artisans will also appreciate that other types of regulation can be readily substituted without departing from the scope of the present invention. In one exemplary embodiment, PWM controllers 113 and 114 respectively process the error signal from the current amplifier relative to a suitable waveform, e.g., ramp, triangular or any other suitable reference waveform, to provide a respective switching signal that, upon suitable amplification, is applied to the FETs of converter stages 20 and 30 to control their on/off duty cycle. Each waveform may be internally generated by controllers 113 and 114 and, in one embodiment, has the same frequency relative to one another. The waveforms can be generated from a waveform generator shared in common by each PWM control circuit. As suggested above, the waveforms can be in phase or can be phase shifted by a predefined angle relative to one another. Control techniques for effectively operating several parallel stages out of phase relative to one another are well established and can advantageously provide the benefits of reduced ripple and improved efficiency as is well understood in the art.

Improvement for Forcing Current Balance in Parallel Converters

Whenever two or more converter stages of essentially the same design, e.g., substantially the same power ratings, are connected in parallel, such stages are expected to share approximately the same average current. In practice, this design goal is difficult to achieve due to component variations, switching speed differences, offsets, etc. For example, referring to FIG. 1, the average current through inductor 203 is based on the difference of average voltage across the capacitor 106 and the average voltage at node 601. The DC resistance of the inductor is generally designed to be relatively small in order to provide low power loss. Hence a small change in the average voltage across inductor 203 will result in a large change in average current through that inductor. With power converter stages 20 and 30 sharing a common capacitor voltage, relatively small differences in the respective duty cycle of the gating signals supplied to the power switching devices in stages 20 and 30 could result in a large imbalance in the power flow carried by each stage.

Traditionally, including a separate current measuring device in each power converter stage and separating the current loops in a manner that forces appropriate current sharing has somewhat alleviated this issue. The inventors of the present invention have recognized, however, that forced current sharing may be efficiently and economically accomplished by forcing the average voltage levels of converter stages 20 and 30 at the switching side of the inductors 203 and 303 to be substantially identical to one another, i.e., the average voltage levels at nodes 601 and 602. In one exemplary embodiment, this can be accomplished by modifying the PWM signal generated by one of the PWM controllers, e.g., PWM controller 114, based on a comparison of the average voltage levels at nodes 601 and 602 in FIG. 1. More specifically, a feedback controller 110 in low-power circuit 50 processes the voltage signals at nodes 601 and 602 to generate a compensating signal for the PWM controller 114.

Figure 2:
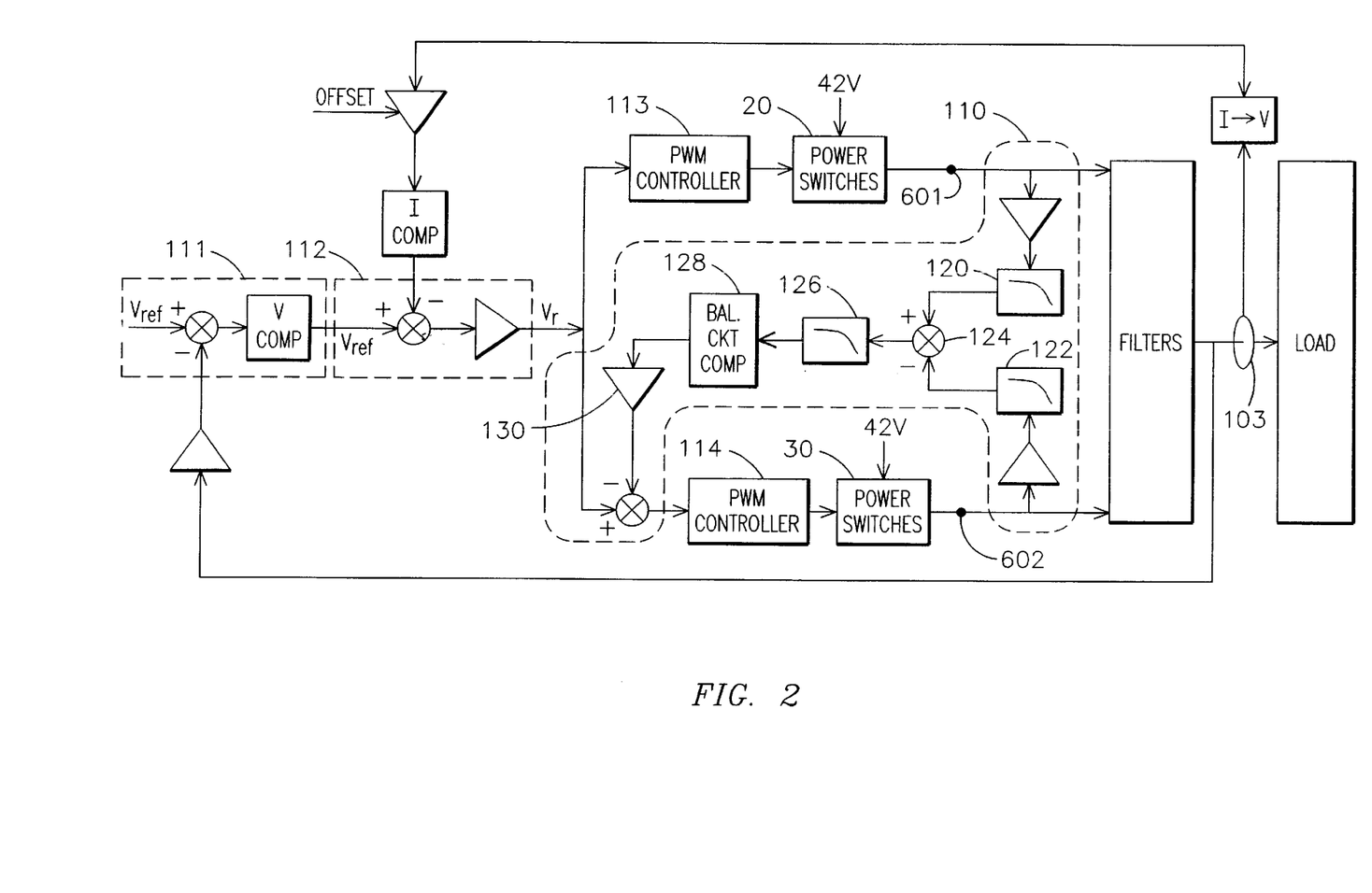
FIG. 2 illustrates a schematic representation of an exemplary feedback controller configured to provide current balance in the power converter stages of the system of FIG. 1 in accordance with one aspect of the present invention.
Figure 3:
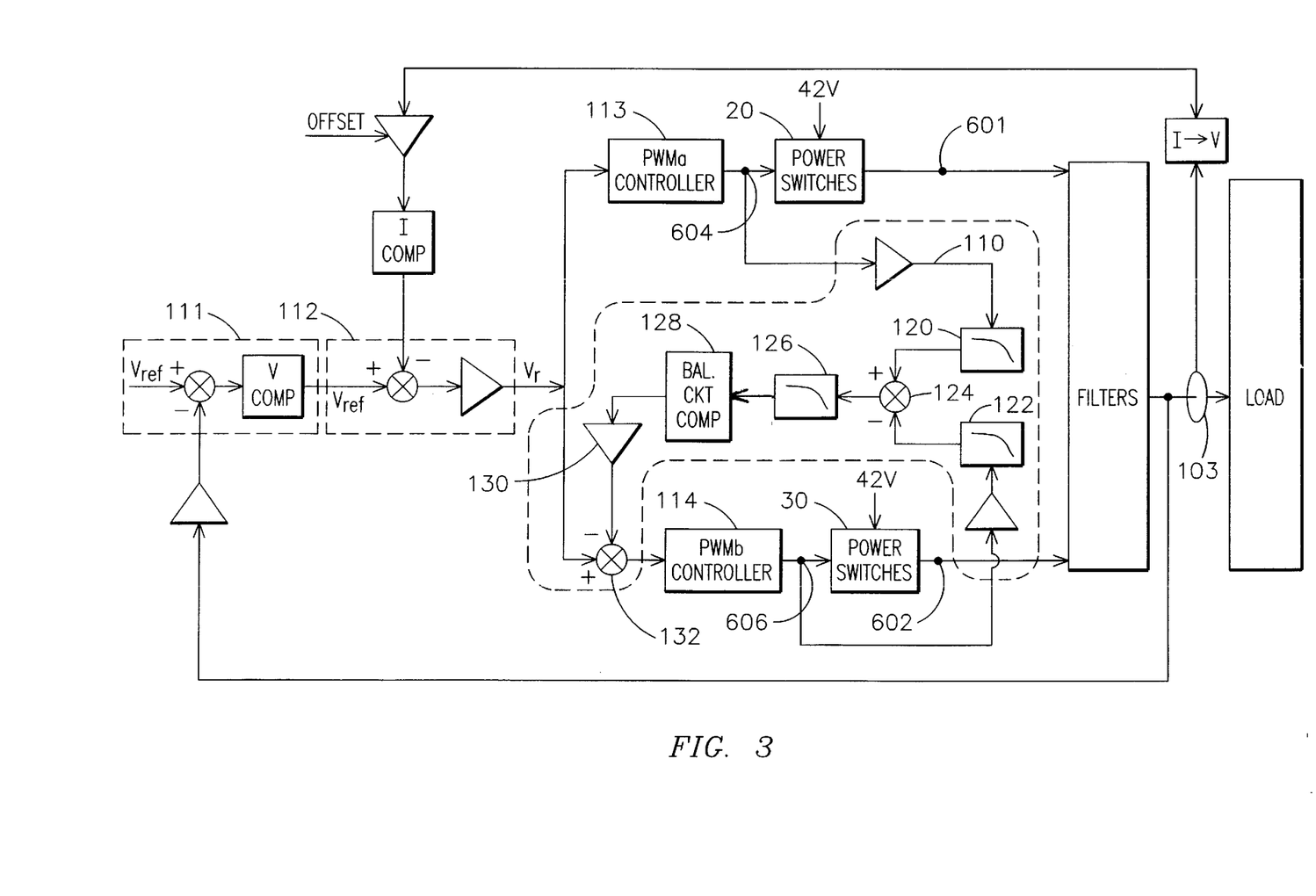
FIG. 3 illustrates another embodiment of the feedback controller of FIG. 2.

FIG. 2 illustrates further details regarding one exemplary embodiment of the feedback controller 110. As seen in FIG. 2, the respective AC voltages at nodes 601 and 602 after suitable signal scaling are each applied to respective averaging filters 120 and 122 having a bandwidth sufficiently low to generate a respective average measurement of the voltage level at nodes 601 and 602. As will be recognized by those skilled in the art, nodes 601 and 602 represent one example of a node set in the power or control circuit which is functionally common to each circuit and which allows for comparing average voltage levels of converter stages 20 and 30. See FIG. 3 for an embodiment illustrating another exemplary set of nodes 604 and 606 to generate a compensating signal for the PWM controller 114.

A signal combiner 124 allows for differentially combining the respective output signals from filters 120 and 122. A noise-reduction filter 126, configured to remove electrical noise that may be present in the differentially combined signal, receives that signal from subtractor 124. A compensator circuit 128 receives the output signal from noise filter 126 to generate the compensating signal applied to the PWM controller 114. For example, if the voltage signals at nodes 601 and 602 (or nodes 604 and 606 in FIG. 3) have essentially the same value, then the value of the signal applied to the compensator circuit 128 will be essentially zero and no correction signal will be applied to PWM controller 114. However, if one of the voltage signals at either of nodes 601 or 602 (or node 604 or 606 in FIG. 3) has a larger value relative to the voltage signal at the other node, then an appropriate compensating signal will be generated by the compensator circuit and applied to PWM controller 114. For example, if the voltage level at node 602 is low compared to the voltage level at node 601, then the duty cycle of the power switches in converter stage 30 will be appropriately increased to bring up the voltage level at node 602 to essentially the same level of node 601. Conversely, if the voltage level at node 602 is high compared to the voltage level at node 601, then the duty cycle of the power switches in converter stage 30 will be appropriately decreased to bring down the voltage level at node 602 to essentially the same level of node 601. It will be appreciated that the foregoing technique for forcing the current sharing wherein one of the switching controllers (e.g., PWM controller 113) is selected as a master controller, and the other switching controller (e.g., PWM controller 114) is selected as a slave controller can be readily applied to multiple paralleled converters either in phase or out of phase and independently of any specific PWM technique.

Improvement for Synchronous Rectification

An exemplary technique and circuit for synchronous rectification in accordance with aspects of the present invention is described in reference to power converter stage 20, which as shown in FIG. 1, comprises gate drivers 204 and 205 and associated FETs 201 and 202. It will be understood, however, that the same technique is equally applicable to power converter stage 30, and any additional converter stages in a power converter system having more than two power converter stages. In the step down mode of power conversion, (e.g., conversion from 42V to 14V) FET 201 functions as a PWM switch while FET 202 would function, at least during some of the switching cycle, in a freewheeling condition allowing conduction of current through its internally built diode, generally referred to in the art as body diode. Under standard rectification techniques, FET 202 generally remains off since its body diode could carry current (e.g., from source to drain) when FET 201 is switched off. The inventors of the present invention, however, have recognized that it is advantageous to turn on FET 202 during the freewheeling period to reduce voltage drop on FET 202 and improve conversion efficiency. More specifically, the inventors of the present invention recognized that using the traditional approach of synchronous rectification could lead to momentary but undesirable discharge of one of the power sources. For example, in the step down mode, it could lead to momentarily discharging the 14V battery if at the end of the freewheeling period, FET 202 would not be turned off. Since the FET is a bi-directional device, it will continue to conduct when the freewheeling current decreases to zero and tries to continue in the other direction. In normal operation, this situation occurs at low currents only and results in greater ripple and in reduced efficiency. To prevent this situation from occurring, the method of synchronous rectification employed in this circuit implementation is for the gate driver 205 to turn on the FET 202 as long as the current through it is in the reverse direction (e.g., from source to drain). Whenever the current in the FET tries to flow in the normal direction, (e.g., from drain to source) the gate driver will detect the change in current flow and will turn off FET 202 allowing the body diode to block current flow. In one exemplary embodiment, a circuit branch 206 connected to the drain terminal of FET 202 allows gate driver 205 to monitor an electrical signal, e.g., voltage and/or current, indicative of the current flow reversal. Gate driver 205 is also configured to automatically turn off FET 202 should FET 201 fail in a short circuit condition and thus prevent shorting the 42V and 14V power sources to ground.

Figure 4:
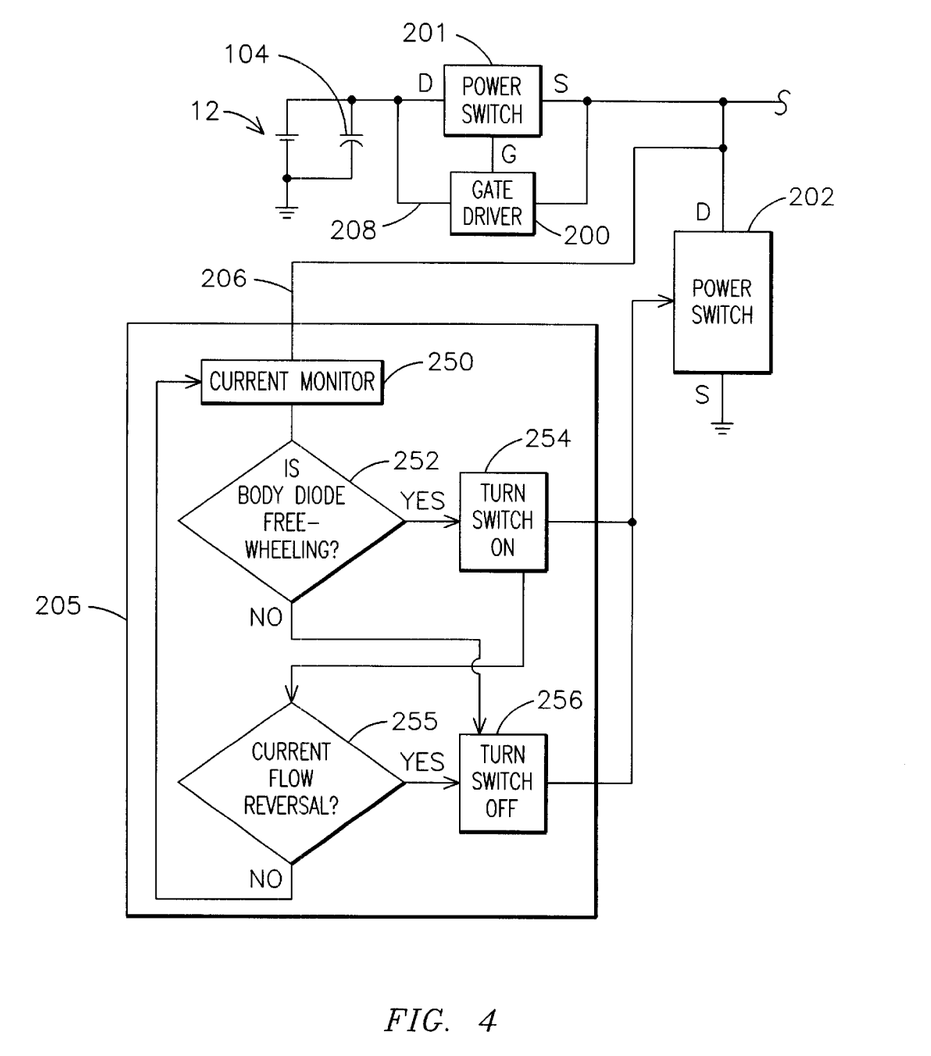
FIG. 4 illustrates a schematic representation of an exemplary gate driver configured to perform improved synchronous rectification techniques in accordance with another aspect of the present invention.

FIG. 4 illustrates exemplary details regarding gate driver 205, for example. It will be appreciated that the same configuration applies to gate drivers 204, 304 and 305. As shown in FIG. 4, each gate driver includes a current monitor 250 connected, for example, to the drain terminal of FET 202 through circuit branch 206. Decision block 252 allows determining whether the FET 202 is freewheeling or not. In the event FET 202 is freewheeling, FET 202 is turned on at block 254. Conversely, if FET 202 is not freewheeling, then FET 202 would be switched off at block 256. If during freewheeling, current flow reversal is detected, then FET 202 will be turned off at block 256. If no current reversal is detected, the process for monitoring current continues at block 250. It will be appreciated by those skilled in the art, that in lieu of monitoring current, one could monitor voltage to achieve essentially the same operational results described above for controlling operation of the freewheeling FET.

In the step up mode of power conversion (e.g., conversion from 14V to 42V) FET 202 is operated as a PWM switch while FET 201 serves as the freewheeling diode. In essentially the same manner described above, gate driver 204 will synchronously turn on and off FET 201 and prevent conduction of current in the event reversal in the current flow is determined (e.g., determining current flow reversal originally from source to drain to the opposite direction, from drain to source) in FET 201 allowing its body diode to block that current flow. In one exemplary embodiment, a circuit branch 208 connected to the drain terminal of FET 201 allows gate driver 204 to monitor an electrical signal, e.g., voltage and/or current, indicative of the current flow reversal. As suggested above, should FET 202 fail in a short circuit condition, in this case gate driver 204 will automatically turn off FET 201 and prevent the power sources from shorting to ground.

Improvement for Input/Output Isolation and Converter Protection

Figure 5:
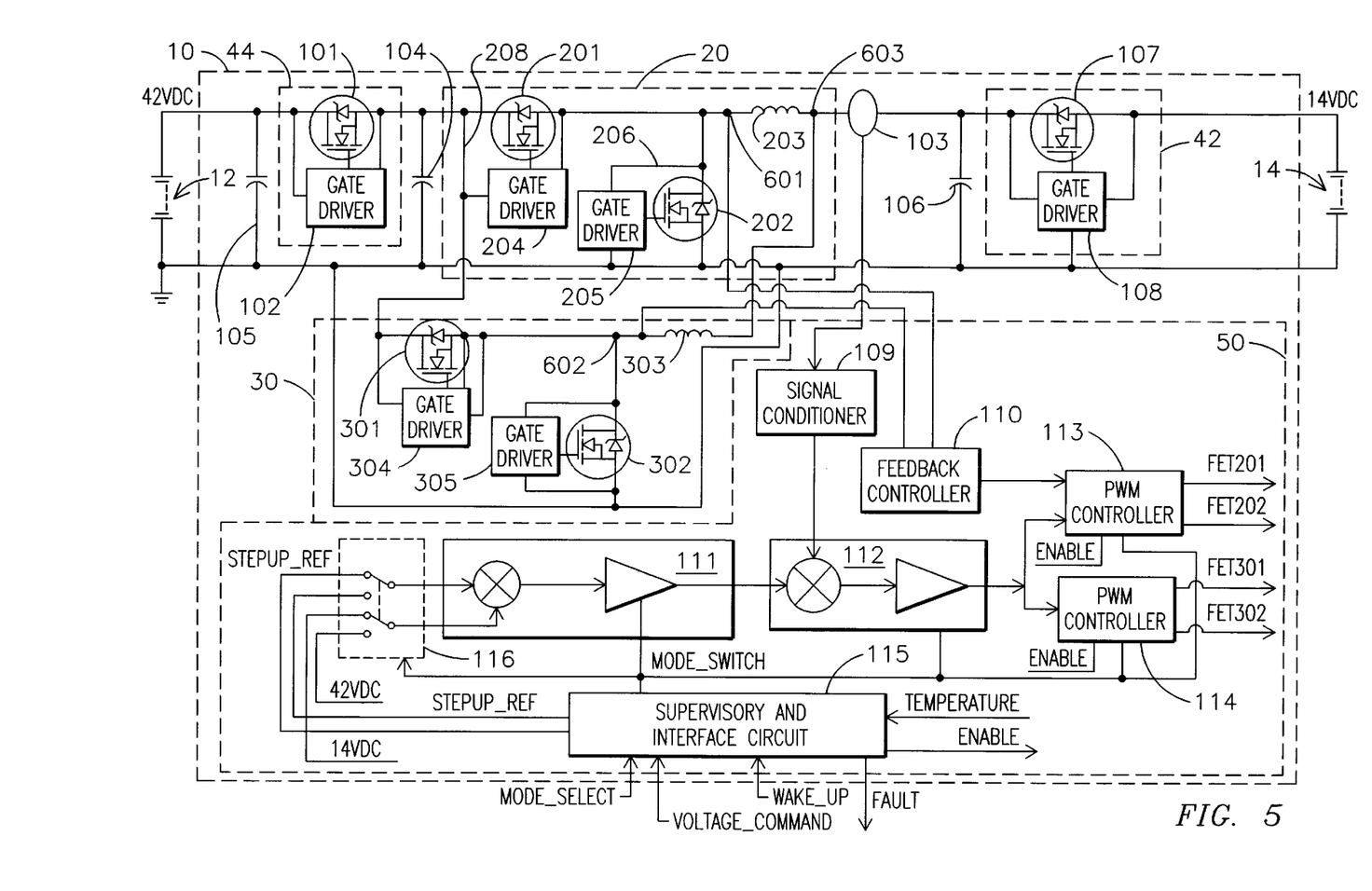
FIG. 5 illustrates a schematic representation of the dual voltage DC/DC converter system of FIG. 1 illustrating an alternative embodiment for an input/output isolation and protection circuit in accordance with still other aspects of the present invention.

When two power sources are connected through a DC/DC converter without galvanic isolation a means of isolating the two sources needs to be provided to protect the sources from faults within the converter and to protect the converter from external faults, for example, improper reversal of the connections for the batteries. In FIG. 1, block 40 represents one exemplary embodiment of the input/output isolation and protection circuit, and in FIG. 5, blocks 42 and 44 represent an alternative embodiment for the isolation and protection circuit. In each embodiment, this circuit utilizes a series combination of power switches configured to prevent power flow through the converter when turned off. For example, FETs 101 and 107 comprise the series switches that are controlled by gate drivers 102 and 108, respectively. It will be appreciated that in one exemplary embodiment, gate drivers 102 and 108 in FIG. 1 may be integrated in a common gate driver. The gate drivers are configured to monitor and control a set of electrical parameters indicative of faulty conditions that would be harmful to the two power sources, the converter, or both. In one exemplary embodiment, the gate drivers respectively monitor the current flow through and the voltages across FETs 101 and 107 in order to prevent excessive power flow, over and under voltages, and reverse polarities from being applied to the two power sources through the converter. This circuit in conjunction with the synchronous control circuit will automatically isolate the power sources from any single point converter failure. The circuit can be utilized in its active mode for bi-directional charge control and ripple reduction by selectively varying the impedance of the switches. Those skilled in the art will recognize that by splitting the input/output isolation and protection circuit into two separate circuit stages, wherein, as shown in FIG. 2, one of the circuit stages, is directly connected to one of the power sources, e.g., the circuit stage represented by block 42 is connected to battery 14, and the other of the circuit stages is connected to the other power source, e.g., the circuit stage represented by block 44 is connected to battery 12, the isolation and protection circuit provides independent polarity reversal protection to both power sources. It will be appreciated that another configuration for the isolation and protection circuit would be to provide the single circuit stage represented by block 40 in FIG. 1 connected to the relatively high voltage power source in lieu of the low voltage power source. It will be appreciated that the designer has the flexibility to choose whichever circuit configuration meets the specific requirements of any given application.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for bi-directionally controlling power flow between at least two separate direct current power sources in a multi-stage power converter system, the method comprising:

providing at least first and second power converter stages coupled in parallel circuit to one another;

providing a first switching controller coupled to selectively actuate a pair of switching devices in the first power converter stage;

providing a second switching controller coupled to selectively actuate a pair of switching devices in the second power converter stage, with one of the first and second switching controllers selected as a master controller, and the other one of the first and second switching controllers selected as a slave controller;

determining an average voltage measurement at a respective node of each the power converter stages;

generating a compensating signal based on the difference of the average voltage measurements at the respective nodes of each of the power converter stages; and applying the compensating signal to the slave switching controller so that the pair of power switching devices coupled to that slave switching controller is selectively actuated to have a respective on and off duty cycle, the duty cycle imparted by the slave controller being adjustable in response to the compensating signal relative to the duty cycle imparted by the master controller to the pair of power switching devices coupled thereto to avoid current imbalance between the power converter stages.

2. The method of claim 1 wherein the first and second switching controllers comprise respective pulse-width modulation controllers.

3. The method of claim 2 wherein determining the average voltage measurement at each respective node of the power converter stages comprises coupling a respective averaging filter to receive a voltage signal from each respective node.

4. The method of claim 3 wherein generating the compensating signal comprises differentially combining the output signal from each averaging filter to supply a resultant signal, and applying the resultant signal to a compensating circuit configured to generate the compensating signal based on the magnitude and polarity of the resultant signal.

5. The method of claim 1 wherein one of the power sources comprises a power source configured to supply a higher voltage relative to the other power source.

6. The method of claim 5 wherein one of the power switching devices in each power converter stage is configured to operate in a first mode of power conversion in pulse-width modulation switching condition, and the other one of the power switching devices is configured to operate, at least part of the time, in a freewheeling condition, and wherein in a second power conversion mode the one power switching device is configured to operate, at least part of the time, in the freewheeling condition, and the other power switching device is configured to operate in the pulse-width modulation switching condition.

7. The method of claim 6 wherein the first mode of power conversion comprises a step-up mode of power conversion, and the second mode of power conversion comprises a step-down mode of power conversion.

8. The method of claim 7 further comprising monitoring a predefined electrical parameter indicative of current passing in a first direction through the freewheeling device and setting that device to an on-state during the freewheeling condition, and to an off-state when current flow reversal relative to that first direction is determined for that switching device.

9. The method of claim 1 further comprising coupling to at least one of the power sources a circuit comprising a pair of power switching devices connected in series circuit and configured to bi-directionally isolate and protect the converter and/or power source under predefined fault conditions.

10. The method of claim 1 further comprising coupling to each of the power sources a circuit comprising a respective power switching device configured to bi-directionally isolate and protect the converter and/or power sources under predefined fault conditions.

11. A multi-stage power converter system for bi-directionally controlling power flow between at least two separate direct current power sources, the power converter system comprising:

at least first and second power converter stages coupled in parallel circuit to one another;

a first switching controller coupled to selectively actuate a pair of switching devices in the first power converter stage;

a second switching controller coupled to selectively actuate a pair of switching devices in the second power converter stage, with one of the first and second switching controllers selected as a master controller, and the other one of the first and second switching controllers selected as a slave controller;

a feedback controller configured to avoid current imbalance between the power converter stages by:

determining an average voltage measurement at a respective node of each the power converter stages;

generating a compensating signal based on the difference of the average voltage measurements at the respective nodes of each of the power converter stages; and applying the compensating signal to the slave switching controller so that the pair of power switching devices coupled to that slave switching controller is selectively actuated to have a respective on and off duty cycle, the duty cycle imparted by the slave controller being adjustable in response to the compensating signal relative to the duty cycle imparted by the master controller to the pair of power switching devices coupled thereto, thus avoiding current imbalance between the power converter stages.

12. The power converter system of claim 11 wherein the first and second switching controllers comprise respective pulse-width modulation controllers.

13. The power converter system of claim 12 further comprising a respective averaging filter coupled to receive a voltage signal from each respective node, each filter configured to determine the average voltage measurement at each respective node of the power converter stages.

14. The power converter system of claim 13 further comprising a signal combiner configured to differentially combine the output signal from each averaging filter to supply a resultant signal, the signal combiner coupled to apply the resultant signal to a compensating circuit configured to generate the compensating signal based on the magnitude and polarity of the resultant signal.

15. The power converter system of claim 11 wherein one of the power sources comprises a power source configured to supply a higher voltage relative to the other power source.

16. The power converter system of claim 15 wherein one of the power switching devices in each power converter stage is configured to operate in a first mode of power conversion in pulse-width modulation switching condition, and the other one of the power switching devices is configured to operate, at least part of the time, in a freewheeling condition, and wherein in a second power conversion mode the one power switching device is configured to operate, at least part of the time, in the freewheeling condition, and the other power switching device is configured to operate in the pulse-width modulation switching condition.

17. The power converter system of claim 16 wherein the first mode of power conversion comprises a step-up mode of power conversion, and the second node of power conversion comprises a step-down mode of power conversion.

18. The power converter system of claim 17 further comprising a circuit configured to monitor a predefined electrical parameter indicative of current passing in a first direction through the freewheeling device, the circuit further configured to set that device to an on-state during the freewheeling condition, and to an off-state when current flow reversal relative to that first direction is determined for that switching device.

19. The power converter system of claim 11 further comprising a circuit coupled to at least one of the power sources and including a pair of power switching devices connected in series circuit and configured to bi-directionally isolate and protect the converter and/or power source under predefined fault conditions.

20. The power converter system of claim 11 further comprising a circuit having respective circuit stages coupled to a respective one of the power sources, each circuit stage including a respective power switching device and, in combination, configured to bi-directionally isolate and protect the converter and/or power sources under predefined fault conditions.

21. A multi-stage power converter system for bi-directionally controlling power flow between at least two separate direct current power sources, the power converter system comprising:

at least first and second power converter stages coupled in parallel circuit to one another;

a first switching controller coupled to selectively actuate a pair of switching devices in the first power converter stage;

a second switching controller coupled to selectively actuate a pair of switching devices in the second power converter stage, with one of the first and second switching controllers selected as a master controller, and the other one of the first and second switching controllers selected as a slave controller;

a feedback controller configured to avoid current imbalance between the power converter stages, the feedback controller comprising:

a circuit configured to determine an average voltage measurement at a respective node of each the power converter stages;

a compensator configured to generate a compensating signal based on the difference of the average voltage measurements at the respective nodes of each of the power converter stages, the compensator being coupled to the slave switching controller to supply the compensating signal thereto so that the pair of power switching devices coupled to that slave switching controller is selectively actuated to have a respective on and off duty cycle, the duty cycle imparted by the slave controller being adjustable in response to the compensating signal relative to the duty cycle imparted by the master controller to the pair of power switching devices coupled thereto, thus avoiding current imbalance between the power converter stages.

\* \* \* \* \*